United States Patent
Falk et al.

(10) Patent No.: US 10,491,504 B2
(45) Date of Patent: Nov. 26, 2019

(54) SYSTEM FOR SUPPORT IN THE EVENT OF INTERMITTENT CONNECTIVITY, A CORRESPONDING LOCAL DEVICE AND A CORRESPONDING CLOUD COMPUTING PLATFORM

(71) Applicant: SIEMENS AKTIENGESELLSCHAFT, München (DE)

(72) Inventors: Rainer Falk, Poing (DE); Volker Fusenig, München (DE)

(73) Assignee: SIEMENS AKTIENGESELLSCHAFT (DE)

(*) Notice: Subject to any disclaimer, the term of this patent is extended or adjusted under 35 U.S.C. 154(b) by 168 days.

(21) Appl. No.: 15/509,406

(22) PCT Filed: Jul. 28, 2015

(86) PCT No.: PCT/EP2015/067218
§ 371 (c)(1),
(2) Date: Mar. 7, 2017

(87) PCT Pub. No.: WO2016/037758
PCT Pub. Date: Mar. 17, 2016

(65) Prior Publication Data
US 2017/0264525 A1    Sep. 14, 2017

(30) Foreign Application Priority Data
Sep. 11, 2014    (DE) .................. 10 2014 218 215

(51) Int. Cl.
*G06F 15/173*    (2006.01)
*H04L 12/26*    (2006.01)
(Continued)

(52) U.S. Cl.
CPC .............. *H04L 43/16* (2013.01); *G06F 9/455* (2013.01); *G06F 9/45558* (2013.01);
(Continued)

(58) Field of Classification Search
CPC .... G06F 9/455; G06F 9/5072; G06F 11/1482; G06F 11/1484; G06F 11/1489;
(Continued)

(56) References Cited

U.S. PATENT DOCUMENTS 10,067,652 B2 * 9/2018 Kleinpeter ........ G06F 17/30575
2003/0097358 A1   5/2003 Mendez
(Continued)

FOREIGN PATENT DOCUMENTS

| CN | 102984189 A | 3/2013 |
|----|-------------|--------|
| EP | 2096563 A1  | 9/2009 |
| EP | 2293164 A1  | 3/2011 |

OTHER PUBLICATIONS

Shi et al. Computing in Cirrus Clouds: The Challenge of Intermittent Connectivity. In Proceedings of MCC 2012.
(Continued)

*Primary Examiner* — Frantz B Jean
(74) *Attorney, Agent, or Firm* — Schmeiser, Olsen & Watts, LLP

(57) ABSTRACT

A system wherein a request can be processed both in a cloud service and autonomously or locally via a client, and a monitoring of the network quality, for example, the presence of delay, is carried out, and wherein, depending on the current accessibility of the cloud platform, optionally a local alternative calculation is carried out, which may be slower or, for example in the event of real-time requirements, is of a lower quality than the corresponding cloud service, and the result thereof is then temporarily used alternatively by the client is provided. In this way, cloud services can be locally
(Continued)

buffered, thereby cushioning connection interruptions between end device and cloud platform, whereby cloud services can be used in a transparent manner for the user and, even in the event of connection interruptions.

11 Claims, 2 Drawing Sheets

(51) Int. Cl.
*G06F 9/455* (2018.01)
*G06F 9/50* (2006.01)
*G06F 11/14* (2006.01)
*H04L 29/08* (2006.01)

(52) U.S. Cl.
CPC ........ *G06F 9/5072* (2013.01); *G06F 11/1482* (2013.01); *G06F 11/1484* (2013.01); *G06F 11/1489* (2013.01); *H04L 43/0811* (2013.01); *H04L 43/0888* (2013.01); *H04L 67/1095* (2013.01); *G06F 2009/45595* (2013.01)

(58) Field of Classification Search
CPC ....... G06F 2009/45595; G06F 9/45558; H04L 67/1095; H04L 43/0811; H04L 43/0888; H04L 43/16
USPC ........................................................ 709/224
See application file for complete search history.

(56) References Cited

U.S. PATENT DOCUMENTS

| | | | |
|---|---|---|---|
| 2011/0093567 A1 | 4/2011 | Jeon et al. | |
| 2011/0239268 A1 | 9/2011 | Scott | |
| 2013/0103837 A1 | 4/2013 | Krueger | |
| 2014/0032763 A1* | 1/2014 | Milojicic | G06F 9/5083 |
| | | | 709/226 |
| 2014/0189692 A1 | 7/2014 | Wang et al. | |
| 2014/0287685 A1* | 9/2014 | Griffin | H04W 12/02 |
| | | | 455/41.2 |
| 2015/0156122 A1* | 6/2015 | Singh | H04L 47/20 |
| | | | 370/235 |
| 2017/0048332 A1* | 2/2017 | Poletto | H04L 67/142 |

OTHER PUBLICATIONS https://support.google.com/drive/answer/1628467?hl=de.
International Search Report for PCT Application No. PCT/EP2015/067218, dated Jan. 18, 2016.
Non-English Chinese Office Action for application No. 201580048747.7 dated Sep. 3, 2019.

* cited by examiner

SYSTEM FOR SUPPORT IN THE EVENT OF INTERMITTENT CONNECTIVITY, A CORRESPONDING LOCAL DEVICE AND A CORRESPONDING CLOUD COMPUTING PLATFORM

CROSS-REFERENCE TO RELATED APPLICATIONS

This application claims priority to PCT Application No. PCT/EP2015/067218, having a filing date of Jul. 28, 2015, based off of German application No. DE 102014218215.8 having a filing date of Sep. 11, 2014, the entire contents of which are hereby incorporated by reference.

FIELD OF TECHNOLOGY

The following relates to a system in which, without a network connection, documents can also be processed locally and in which the documents stored offline can then be synchronized when a network connection is available.

BACKGROUND

In the case of computer clouds or cloud computing, services and data are relocated and are available via the Internet or an intranet. In such a case, the user thus needs to have a network connection in order to be able to use a cloud application. In certain application scenarios, such as in the automotive or mobile sector, for example, users typically do not have a permanent, uninterrupted connection to the Internet, however. Further, in the case of automation systems, for example, there are high demands on availability and there is the desire for such systems to be intended to continue to operate autonomously even without a connection to a network.

In general, it is known practice to provide redundant network connections, e.g. multiple cables or a landline network connection and a mobile radio connection. In the event of failure of one network, it is thus possible to use the second network to communicate.

Further, it is known practice to provide redundant servers in a computer center, so that a redundant substitute server can undertake service provision in the event of failure of a server. High-availability solutions of this kind are complex, however, and therefore expensive and not available generally in the case of cloud services.

In Shi et al. Computing in Cirrus Clouds: The Challenge of Intermittent Connectivity. In Proceedings of MCC 2012. ACM. 2012, applications are normally executed locally on the terminal and, on connection to a cloud, these applications can be relocated to the cloud as required.

In the case of the cloud-based application "Google Docs" it is possible to configure an offline mode, see https://support.google.com/drive/answer/1628467?hl=de. In this context, activation is possible such that documents are processable locally even without a network connection, with the documents stored offline then being synchronized when a network connection is available.

SUMMARY

An aspect relates to specifying a system for support in the event of intermittent connectivity between a local device and a cloud computing platform, in which the highest possible availability is achieved with the lowest possible complexity and in which cloud services can continue to be used with the least possible restrictions and transparently for the user even in the event of connection interruptions.

Embodiments of the invention essentially relates to a system in which a request, e.g. a computation, is processable both in a cloud service and autonomously or locally by a client and, in this case, the network quality, for example the presence of delay, is monitored and in which, on the basis of the current availability of the cloud platform, a local substitute computation is possibly performed, which may be slower or, in the case of real-time demands, has a lower quality than the corresponding cloud service, and the result of which is then used temporarily as a substitute by the client. This allows cloud services to be buffered locally and hence connection interruptions between terminal and cloud platform to be cushioned, which means that cloud services can be used by the user transparently even in the event of connection interruptions, possibly with only a slight restriction, and hence further application scenarios can be opened up for cloud computing or the quality of service of known scenarios/applications can be improved. Embodiments of the invention can be used, by way of example, for the evaluation of image data in the medical sphere, for route computations in the navigation field, for image recognition in the automobile sphere and for computer games.

BRIEF DESCRIPTION

Some of the embodiments will be described in detail, with reference to the following figure, wherein like designations denote like members, wherein.

DETAILED DESCRIPTION

In this case, a cloud platform CP covers the various embodiments Infrastructure-as-a-Service (I-a-a-S), Platform-as-a-Service (P-a-a-S) and Software-as-a-Service (S-a-a-S).

A local device LG is intended to be understood to mean e.g. a smartphone, laptop, industrial control installations and automobiles.

Figure 1:
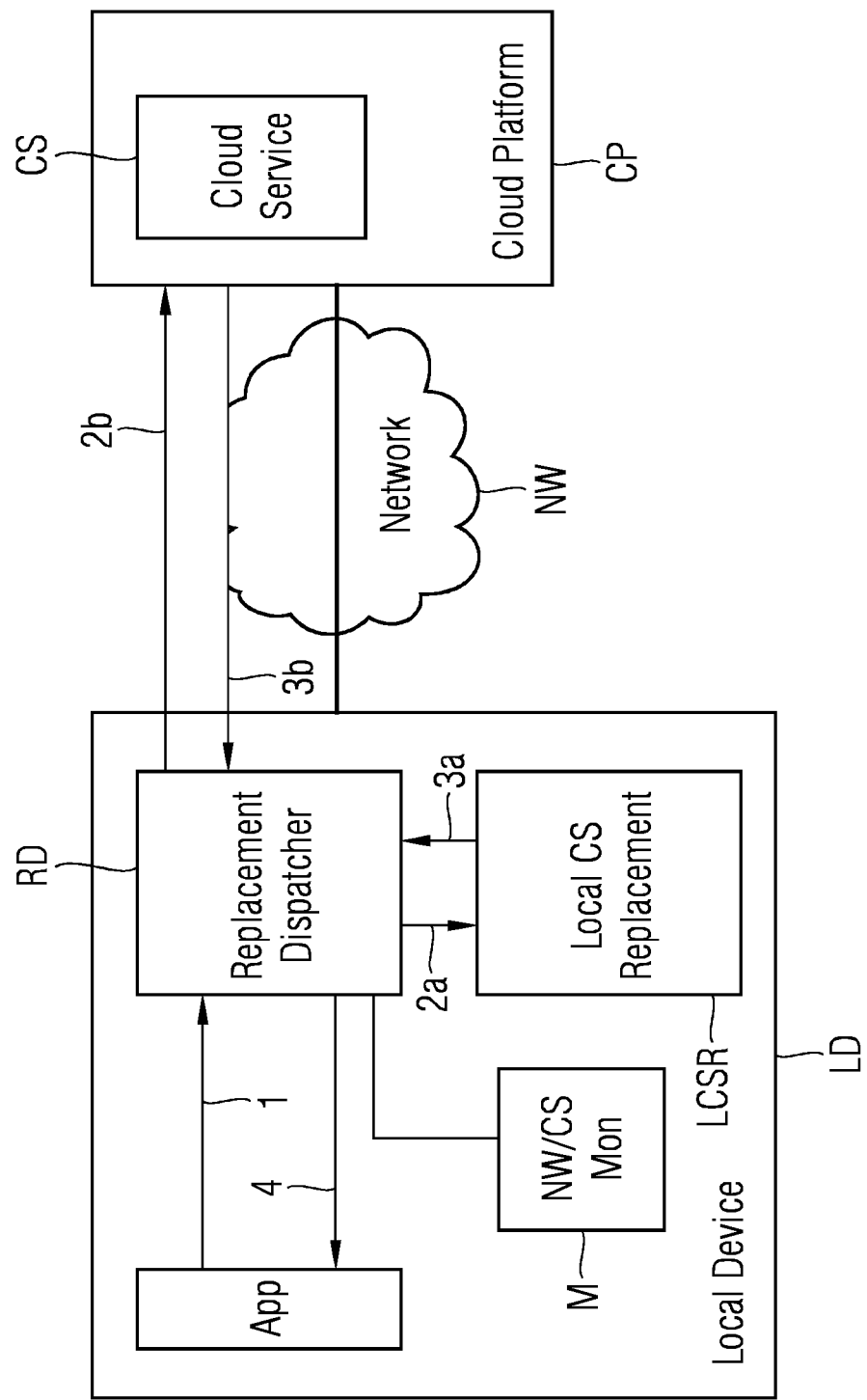
FIG. 1 shows an overview depiction to explain an embodiment of a system.

FIG. 1 shows a local device LD that executes a cloud application App locally, which cloud application makes a request to a cloud service CS by transmitting a request message 1, and this request message 1 receives a response with an appropriate response message 4.

According to embodiments of the invention, the request is duplicated locally on the device LD by a substitute provision unit or replacement dispatcher RD, and one request 2a is transmitted to the local substitute functionality unit LCSR of the cloud service CS and the other request 2b is transmitted to the actual cloud service CS. The substitute provision unit RD accordingly receives two response messages 3a (local response) and 3b (cloud service response) for these requests.

The replacement dispatcher RD provides the application App with one of the two responses according to a prescribable substitution guideline (Replacement Dispatcher Policy). It is optionally also possible for not, as depicted here, both services CS and LCSR (Cloud Service, Local CS Replacement) to receive the request, but rather for only one of the two to receive a request on the basis of the substitution guideline.

This has the advantage that the application App itself does not have to be produced or adapted specifically for intermittent network communication. It is also not necessary for the app itself to provide the logic of the cloud service, since the substitute computation is produced by a specific component LCSR.

In one variant, the substitution guideline is provided for the replacement dispatcher RD by the cloud service.

Diverse variants are conceivable concerning which criteria are used to make a substitution guideline decision A network/cloud service monitor M monitors the quality, particularly signal delay, throughput and, indirectly, signal strength, transmission method and own position of the network connection to the cloud service or the response time of the cloud service. On the basis of this, a request by the application App is provided for the local substitute functionality unit LCSR of the cloud service CS or for the cloud service CS itself.

A request by the app is buffer-stored and transmitted to the cloud service CS. A timer is started. If an associated response from the cloud service is not received within a prescribable time, then the buffer-stored request is provided for the local substitute service (local CS replacement) and the response thereof is returned to the app. If, however, an associated response from the cloud service is received within the prescribable time, then it is returned to the app.

A request by the app is buffer-stored and transmitted to the cloud service and to the local substitute service (local CS replacement). A timer is started. A response by the local substitute service is buffer-stored as a substitute response. If an associated response from the cloud service is not received within a prescribable time, then the buffer-stored substitute response is returned to the app. If, however, an associated response from the cloud service is received within the prescribable time, then it is returned to the app and the buffer-stored substitute response is erased.

Applications with great resource requirements but without real-time demands, for example evaluation of image data in the medical sphere or route calculation in the field of navigation, are executed on the cloud platform CP as standard in this case and the results of these applications are sent to the terminal LD. If the local device LD cannot access the cloud platform CP, then the local device LD performs the calculations locally in this case and, as a result, usually more slowly or with increased battery loading.

Applications with great resource requirements and high real-time demands, for example image recognition in the automotive sphere and computer games with reducible graphics performance, are likewise executed at full power on the cloud platform CP as standard and the results of these applications are sent to the terminal LD. If the local device LD cannot access the cloud platform CP or the real time demands cannot be observed by the cloud platform and/or the current network connection, then the local device performs substitute computations locally and, if need be, in poor quality in this case, as a result of which the real time demands are observed.

Such an application may, in a manner comparable to P-a-a-S, be installed both on the cloud platform side and on the local device LD side, and the processed data or the results need to be synchronized when the terminal LD is connected to the cloud. In the event of disconnection, the local application App is automatically continued based on the data delivered by the cloud platform CP.

The local substitute functionality LCSR can optionally also be provided by a virtual machine that has been provided by the cloud platform CP. When the client or the local device LD registers with a cloud service CS, the cloud service can provide a virtual machine therefor that is hosted locally on the client. If the cloud service does not respond to a request in good time when used or the network connection is too poor, then the local substitute functionality in the form of a local replica of the virtual machine is used instead.

In a variant, a virtual machine image, i.e. program code and data for performing the local substitute functionality, is provided by the cloud service. This can be updated by the cloud service in one variant.

The local device LD may be provided as a physical unit, e.g. in a housing. However, it is also possible for the local unit to be provided in the form of interconnected components. These may be arranged e.g. in a switchgear cabinet, on a top hat rail, in a rack, e.g. 19" rack, or in a switchroom. They may be connected e.g. via a data connection, e.g. a serial interface, a parallel interface, via Ethernet or wirelessly, e.g. via Bluetooth, Zigbee or WLAN.

Embodiments of the invention checks not only whether or not connectivity is available, but also the quality of an available connection, for example the presence of delay, as a result of which it additionally monitors whether the real-time properties are observed.

In general, a real-time checking criterion is monitored. This may be the response time of a cloud service. This means the period of time after sending a message to the cloud service after which the associated response message is received. In this case, the response time is dependent on the transmission delay to the cloud service and from the cloud service and on the processing time by the cloud service. The transmission delay is dependent not only on the signal transmission delay, e.g. via cables or optical fibers or via radio, but also on delays by intermediate components on the transmission link, e.g. switches or routers. Alternatively, the real-time checking criterion used may be a different measure, such as latency (delay) on the transmission link or part of the transmission link, a piece of load information for a transmission link or section of the transmission link, a piece of load information for the cloud service or the cloud platform, a piece of interference source information (interferers, e.g. for radio transmission) or a piece of denial-of-service attack recognition information.

Figure 2:
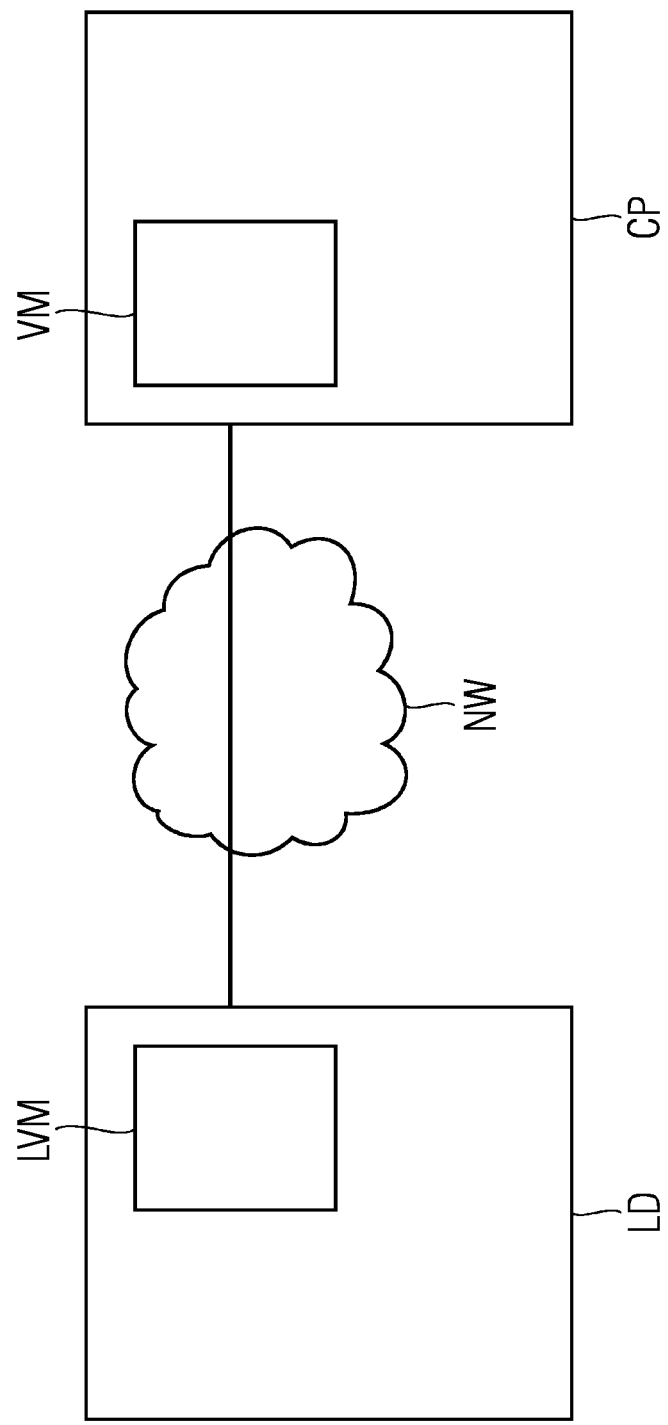
FIG. 2 shows a depiction to explain an optional embodiment detail from the system.

FIG. 2 in turn shows firstly a local device LD and secondly a cloud platform CP, the cloud service CS from FIG. 1 in this case being in the form of a virtual machine VM and the substitute functionality unit LCSR from FIG. 1 being in the form of a local replica LVM of the virtual machine VM, provided by the cloud platform CP, however. The synchronization of the data of the local virtual machine LVM with the corresponding virtual machine VM is preferably provided by the cloud platform CP, the operating data of the local virtual machine LVM being synchronized with the cloud platform CBP.

In this context, in a manner comparable to I-a-a-S, an identical or functionally associated virtual machine runs on the local device LD and the cloud platform CP, which virtual machine is synchronized in the event of connection of the local device to the cloud. When the local device LD is connected to the cloud platform CP, the virtual machine VM that is on the cloud platform is executed and the states of this virtual machine VM are synchronized to the local virtual machine LVM on the local device LD. In the event of disconnection, the virtual machine VM in the cloud platform CP is stopped and the virtual machine LVM on the terminal is started with the currently synchronized state. All state changes on the local virtual machine LVM are recorded until the local device LD has a connection to the cloud platform again. In the event of a connection, all buffered state changes are synchronized to the cloud platform CP. The virtual machine VM in the cloud platform CP is then executed again and the local virtual machine LVM on the local device LD is stopped.

The local virtual machine LVM can be executed on the same computation unit (CPU or CPU core) as the application App. Similarly, it is possible for the local virtual machine LVM to be executed on another computation unit of the local device LD. In a variant, the local device contains a dedicated computation unit for executing the local virtual machine LVM.

The locally hosted replica LVM of the virtual machine VM can be automatically checked for updates. If need be, the cloud platform CP provides a delta version, i.e. a compact representation of the differences. However, it is optionally also possible to provide a complete updated virtual machine.

It is optionally possible for different authorization checks, e.g. service level agreement of the cloud user, platform configuration attestation of the local cloud platform, data structure or use data of the local replica LVM, to be performed in order to decide whether a local replication of this kind for a cloud service is admissible.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A system for support in a network between a local device and a cloud computing platform,
   wherein the local device makes a request that is processable both in a cloud service and by the local device,
   wherein a connection quality of the network is monitored, and
   in an event of a drop below a certain threshold for a current availability of the cloud platform, local substitute processing of the request is performed and the processing result thereof is then used temporarily as a substitute by the local device;
   further wherein, in an event of intermittent connectivity between the local device and the cloud computing platform, the local device makes duplicate requests to the cloud service and a local substitute functionality unit of the cloud service, wherein the duplicate requests are made using a substitute provision unit, and wherein the substitute provision unit provides the cloud application with one of the two responses to the two duplicated requests according to a prescribable substitution guideline.

2. The system as claimed in claim 1, in which instead of the two requests, either only the first request is made to the local substitute functionality unit or the second request is made to the cloud service, depending on the prescribable substitution guideline.

3. The system as claimed in claim 1, in which the local device executes the cloud application locally, and the cloud application makes a request to the cloud service by transmitting a request message to a substitute provision unit that is present locally on the device, to which the substitute provision unit, for its part, responds with an appropriate response message.

4. The system as claimed in claim 1, in which the local device duplicates the request using a substitute provision unit and transmission is effected both to a local substitute functionality unit of the cloud service and to the actual cloud service by virtue of a first duplicated request being transmitted to a local substitute functionality unit of the cloud service and a second duplicated request being transmitted to the cloud service, and the substitute provision unit receives a first response message from the local device and a second response message from the cloud service.

5. The system as claimed in claim 1, in which the local device contains a network/cloud service monitor for quality monitoring such that signal delay and/or throughput and/or signal strength and/or response time of the cloud service are ascertained and, on the basis thereof, the substitution guideline is used to provide the request by the application either for the local substitute functionality unit of the cloud service or for the cloud service itself.

6. The system as claimed in claim 1, in which the request by the application is buffer-stored and transmitted to the cloud service, wherein a timer is started, and in which, if an associated response is not received from the cloud service within a prescribable time, then the buffer-stored request is provided for the substitute functionality unit and the response thereof is returned to the application, and otherwise the associated response from the cloud service is returned for the application.

7. The system as claimed in claim 1, in which the request by the application is buffer-stored and is transmitted both to the cloud service and to the local substitute functionality unit, wherein a timer is started, in which the response by the local substitute service is buffer-stored as a substitute response and, if an associated response by the cloud service is not received within a prescribable time, then the buffer-stored substitute response is returned to the application, and otherwise the response by the cloud service is returned to the application and the buffer-stored substitute response is erased.

8. The system as claimed in claim 1,
   in which the local device and the cloud platform each hold an identical or functionally associated virtual machine,
   in which, when the local device is connected to the cloud platform, the virtual machine of the cloud platform is executed and the states thereof are synchronized to the virtual machine of the local device,
   in which the virtual machine of the cloud platform is stopped in the event of disconnection and the virtual machine of the local device is started with the currently synchronized state,
   in which all state changes of the virtual machine of the local device are recorded until the local device has a connection to the cloud platform again, and
   in which all buffered state changes of the virtual machine of the local device are synchronized to the cloud platform, provided that there is a connection between device and platform, and then the virtual machine in the cloud platform is executed again and the local virtual machine on the terminal is stopped.

9. A device with support in the event of intermittent connectivity to a cloud computing platform,
   wherein a cloud application is locally executable on the device and a request is sendable to a cloud service,
   wherein a substitute provision unit is present such that the request is duplicatable and the duplicated requests are transmittable both to a local available substitute functionality unit of the cloud service and to the actual cloud service of the cloud computing platform, and wherein the substitute provision unit provides the application with one of the two responses to the two duplicated requests according to a prescribable substitution guideline.

10. A method for processing a request during intermittent connectivity to a cloud computing platform having a cloud service, providing a local device connected to the cloud computing platform, the local device comprising a substitute provision unit, wherein the local device locally executes a cloud application and generates a request for the cloud service, wherein the substitute provision unit duplicates the request and transmits the duplicate requests to both a local available substitute functionality unit of the cloud service and to the actual cloud service of the cloud computing platform, and wherein the substitute provision unit provides the cloud application with a response to the request, wherein the response to the request is generated from one of the local available substitute functionality unit of the cloud service and the actual cloud service of the cloud computing platform.

11. The method of claim 10, wherein the provision of the response is based on a prescribable substitution guideline.

* * * * *